United States Patent
Hellwig et al.

(10) Patent No.: US 8,369,267 B2
(45) Date of Patent: Feb. 5, 2013

(54) TECHNIQUE FOR CONTROLLING ESTABLISHMENT OF A TANDEM-FREE TRANSCODER OPERATION

(75) Inventors: Karl Hellwig, Wonfurt (DE); Dirk Kampmann, Vaals (NL); Andreas Witzel, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 642 days.

(21) Appl. No.: 12/523,675

(22) PCT Filed: Jan. 18, 2007

(86) PCT No.: PCT/EP2007/000425
§ 371 (c)(1),
(2), (4) Date: Nov. 19, 2009

(87) PCT Pub. No.: WO2008/086823
PCT Pub. Date: Jul. 24, 2008

(65) Prior Publication Data
US 2010/0110980 A1   May 6, 2010

(51) Int. Cl.
*H04W 4/00* (2009.01)
*H04W 40/00* (2009.01)

(52) U.S. Cl. .......... 370/328; 370/329; 455/445
(58) Field of Classification Search .......... 370/328, 370/329; 455/445
See application file for complete search history.

(56) References Cited

U.S. PATENT DOCUMENTS

| | | | |
|---|---|---|---|
| 6,108,560 A * | 8/2000 | Navaro et al. | 455/517 |
| 7,996,012 B2 * | 8/2011 | Wigell | 455/445 |
| 2005/0180456 A1 * | 8/2005 | Bultinck et al. | 370/465 |
| 2005/0232232 A1 * | 10/2005 | Farber et al. | 370/352 |
| 2007/0171841 A1 * | 7/2007 | Witzel et al. | 370/254 |
| 2007/0230448 A1 * | 10/2007 | Wang | 370/352 |

* cited by examiner

*Primary Examiner* — Kenny Lin

(57) ABSTRACT

The invention relates to a technique for controlling establishment of a tandem free operation (TFO) for transfer of TFO frames including content frames between a first and a second transcoder unit without transcoding of the content frames. A method aspect of the technique comprises the steps of transmitting, in case a remotely used codec does not meet a codec compatibility condition, a first transparent mode message indicating to in-path equipment a transparent mode for subsequent transparent TFO negotiation, and transmitting, in the transparent mode, a TFO configuration frame indicating a local TFO codec list.

12 Claims, 6 Drawing Sheets

100

```
┌─────────────────────────────────┐
│ Receive, in context with a TFO re-
│ quest, information about a remotely
│ used codec associated with a re-
│ mote transcoder unit
└─────────────────────────────────┘ — 102
              ↓
┌─────────────────────────────────┐
│ Determine, in response to the TFO request, if the
│ remotely used codec meets a codec compatibility
│ condition
└─────────────────────────────────┘ — 104
              ↓
┌─────────────────────────────────┐
│ Transmit, in case the remotely used codec does
│ not meet the codec compatibility condition, zero or
│ more transparent mode messages indicating to in-
│ path equipment a transparent mode for subse-
│ quent transparent TFO negotiation
└─────────────────────────────────┘ — 106
              ↓
┌─────────────────────────────────┐
│ Transmit, in the transparent mode, a TFO configu-
│ ration frame indicating a local TFO codec list
└─────────────────────────────────┘ — 108
              ↓
┌─────────────────────────────────┐
│ Transmit, in the transparent mode, zero or more
│ normal mode messages indicating to in-path
│ equipment a normal mode
└─────────────────────────────────┘ — 110
              ↓
           ( Return ) — 112
```

TECHNIQUE FOR CONTROLLING ESTABLISHMENT OF A TANDEM-FREE TRANSCODER OPERATION

FIELD OF THE INVENTION

The invention generally relates to the field of transcoding content data in communication networks such as mobile networks. More specifically, the invention relates to a technique for controlling establishment of a tandem-free operation (TFO) for the transfer of TFO frames including content frames between a first and a second transcoder unit without transcoding of the content frames.

BACKGROUND OF THE INVENTION

Mobile-to-mobile calls (MMCs) typically require today that a speech signal is digitally encoded in the originating mobile user device, sent over a first air interface, transcoded into PCM encoded speech by a first transcoder unit in a fixed network, carried over the fixed network, transcoded again by a second transcoder unit, sent over a second air interface and is finally decoded in the terminating mobile user device. The speech signal is thus typically transcoded from a compressed speech codec adapted to the first air interface into an intermediate representation, typically into PCM (Pulse Code Modulation) encoded speech according to G.711, and is then transcoded again into a speech codec adapted to the second air interface, which may be the same or another codec as used over the first air interface. The term "codec" refers to a coding-decoding mechanism for performing encoding and decoding on a digital data stream.

Tandem-free operation (TFO) as defined by the 3GPP ($3^{rd}$ Generation Partnership Project) in its TS (Technical Specification) 28.062 provides a mechanism that avoids the two transcoding steps in MMCs if the speech codecs used over the air interfaces are compatible to each other. To this end, the TS 28.062 defines a TFO protocol for in-band signalling between the two transcoder units involved in the MMC. The transcoder units may for example include a TRAU (Transcoding Rate Adaptation Unit) in a GSM network or a MGW (Media Gateway) in an UMTS network.

TFO will be established in case the speech codecs used over the air interfaces are identical or at least compatible with each other. In case TFO is operational, each transcoder unit receives speech frames via its air interface and forwards them without transcoding (e.g., embedded into a PCM link in the network) to its TFO partner, the distant or remote transcoder unit, which then forwards the received speech frames without transcoding via its air interface.

Any in-path equipment (IPE) in the call path between the two transcoder units, which may normally modify the speech signal, has to be removed from the path (or made transparent), because it may destroy the TFO control signalling (i.e. the transparent TFO channel) which would lead to the abortion of a TFO procedure. Such in-path equipment may comprise for example echo cancellers or level shifters, cf. TS 28.062, Annex B.

For establishing TFO, the two transcoder units have to initiate a TFO in-band negotiation procedure. Each of the transcoder units indicates its locally used speech codec (termed "Local Used Codec", LUC, in the TS 28.062) to the TFO partner. If the codecs are at least compatible to each other, TFO will be established in the (PCM) call path between the two transcoder units. The establishment procedure comprises exchanging transparent mode messages, e.g. the TFO_TRANS(n) messages according to the TS 28.062, which indicate to the IPE along the path that subsequent speech frames will be exchanged as well as TFO control bits and TFO messages according to the TFO in-band signalling protocol which will need to be transparently exchanged via the PCM link within the fixed network. The IPE will from then on pass the respective bits in the PCM frames transparently. TFO is then in the state "OPERATION", and TFO frames, which include speech frames as received via the air interfaces, may be exchanged between the TFO partners.

When TFO is in the OPERATION state, TFO codec lists (TCLs) may be exchanged for (further) codec optimization. The TCLs may be exchanged via configuration frames, e.g. the Generic Configuration Frames (GCFs) defined in TS 28.062, Annex H, whose transmission mechanism differs from the TFO signalling messages according to the TFO in-band signalling protocol. The GCFs may be sent as replacement of the TFO speech frames. This does not degrade the speech quality during already established TFO, as such a replacement is performed only sporadically. The instantaneous (short term) data rate is as high as the data rate for TFO frames, e.g. 8 kbit/s (i.e. 160 bit/20 milliseconds) or 16 kbit/s (i.e. 320 bit/20 milliseconds). Alternatively, the TCLs may be transmitted without TFO being established (e.g. in the TFO state MISMATCH) by TFO signalling messages such as the TFO_REQL or TFO_ACK_L messages, and thus are conveyed with an instantaneous data rate of only less than 500 bits per second only (to not distort the speech quality).

If it is determined that the LUCs of the two transcoder units are incompatible to each other, TFO cannot be established. In that case, no transparent mode messages are exchanged. TFO signalling messages may be exchanged nonetheless, including the TCL specifying each codec type available for the respective TFO interface. However, this procedure is slow (a single TFO_REQ_L signalling message including a complete TCL takes at least 180 milliseconds and may take on the average 300 milliseconds) compared to TFO establishment in case of matching LUCs, which takes of order several ten milliseconds only. Further, the codec types as exchanged via the TFO inband signalling mechanism are represented as a bit vector, in which one specific bit signals the support of a certain codec type. This mechanism does not allow the signalling of a preference of particular codec types nor does it allow to specify detailed configuration information for a particular codec.

A technique is needed for controlling establishment of a tandem-free transcoder operation in case the locally used codecs of both sides are not compatible to each other, which technique is fast, reliable and does not have an undesirable impact on the speech quality.

SUMMARY OF THE INVENTION

According to a first aspect of the invention, a method of controlling establishment of a TFO for transfer of TFO frames including content frames between a first and a second transcoder unit without transcoding of the content frames is proposed. The method comprises the steps of receiving, in context with a TFO request, information about a remotely used codec associated with a remote transcoder unit; determining, in response to the TFO request, if the remotely used codec meets a codec compatibility condition; transmitting, in case the remotely used codec does not meet the codec compatibility condition, a first transparent mode message indicating to in-path equipment a transparent mode for subsequent transparent TFO negotiation and transmitting, in the transparent mode, a TFO configuration frame indicating a local TFO codec list.

The content frames may for example be speech frames, or may comprise other content data, for example video data. The first and the second transcoder units may be configured as stand-alone devices (e.g. TRAUs) or they may be incorporated into other hardware devices, for example in a MGW of a 3GPP network. TFO may be established between any two transcoder units; therefore the invention is applicable not only to mobile networks including GSM and UMTS/WCDMA networks, but is applicable generally to communications networks in which communication data has to be transcoded. For example, any wireless network comprising an air interface may have the requirement of transcoding speech or other content data for communication over the air interface.

The TFO request may take the form of a request message. The message may include information indicating the LUC of the remote transcoder unit as the remotely used codec. The request message and the transparent mode message may be messages according to an in-band signalling protocol for transferring signalling within the communication link between the transcoder units. For example the IS-mechanism according to TS 28.062 may be used for conveying signalling messages via PCM. By transmitting the transparent mode message, any IPE is forced to let subsequent TFO frames including TFO configuration frames pass transparently. The destination of the transparent mode message may be the remote transcoder unit (instead of "remote transcoder unit" in the TS 28.062 frequently the term "distant transcoder unit" is used. Both adjectives 'remote' and 'distant' are used synonymously herein).

The codec compatibility determination may include comparing the LUC used at the nearby air interface to the received remotely used codec, e.g. the LUC of the remote transcoder unit. In case both LUCs are identical or at least compatible to each other, the codec compatibility condition is met.

The TFO configuration frame is a frame which is transmitted in-band, but much faster than a signalling message. The configuration frame may for example be based on the generic configuration frames (GCFs) defined in the TS 28.062. For example, the configuration frame may be a GCF Request (Con_Req) or an GCF Acknowledge (Con_Ack). The configuration frame is preferably passed in the same way as the TFO frames carrying content between the transcoder units, i.e. a GCF is replacing a TFO speech frame. The GCF may be structured for coding the TCL such that the structure is compatible to the structure of the Codec lists passed in OoBTC/BICC (Out-of-Band Transcoder Control/Bearer Independent Call Control) and/or SIP/SDP (Session Initiation Protocol/Session Description Protocol) procedures. The configuration frame thus typically does not comprise speech data, but comprises signalling data, in particular the TCL of the sending transcoder unit.

In a variant of the invention, a normal mode message (e.g. a TFO_Normal message) is transmitted after the TFO-configuration frame, the normal mode message indicating to in-path equipment the end of the transparent mode and the fallback to normal operation. In another variant of the invention, no normal mode message is sent after the TFO configuration frame, such that any in-path equipment stays in transparent mode.

In one mode of the invention, two or more first transparent mode messages are transmitted prior to transmitting the TFO configuration frame. For example, an IPE may swallow (absorb) a transparent mode message it receives. Therefore, in case there are n IPE items in the call path, a number of n+1 transparent mode messages may have to be sent. The exact number of transparent mode messages (two or more) may depend on the network settings.

In one variant of the invention, the method further comprises the steps of receiving a second transparent mode message from the remote transcoder unit; and transmitting the TFO configuration frame in response to the received transparent mode message. The remote transcoder unit may indicate with the second transparent mode message that it is also enabled for the method according to the invention. In the alternative, the TFO configuration frame may be sent in any case subsequently to the transparent mode message to the remote transcoder unit, i.e. without waiting for a response message. The remote transcoder unit may be adapted to receive the TCL first and may only then respond with its own transparent mode message and configuration frame.

The transparent mode message or messages may indicate that all frame bits are to be passed transparently (for example in a TS 28.062 framework, the transparent mode message/s may indicate that all PCM bits are to be passed transparently by IPE). In this case, the TFO configuration frame may use all frame bits for indicating the local TFO codec list, i.e. the TFO configuration frame may completely replace another TFO frame, e.g. a content frame (speech frame) and the TFO configuration frame can be transmitted between the TFO partners without being corrupted by IPE in the path. For example, in case the TFO frames are embedded in PCM frames including 8 bits per frame, the transparent mode message(s) may indicate that 8 bits are to be handled transparently. Regarding the structure of the configuration frame, a similar structure as for the transfer of codec lists in BICC or SIP may be used, which may be slightly adapted to the needs of a TFO framework (e.g. a GCF must be 20 ms long and must follow a certain sync scheme).

The local TFO codec list transmitted to the remote transcoder unit may indicate a preference of codecs. For example, the codecs may be ranked according to their relative positioning in the configuration frame. Additionally or alternatively, the TFO codec list transmitted to the remote transcoder unit may indicate configuration information for at least one codec. The configuration information may for example include information related to a codec mode or other configuration parameters of the respective codec. The local TFO codec list may also list a codec type several times, but with different configuration data. In general, the locl TFO codec list may comprise the same or similar information as, e.g., an OoBTC message.

The method may comprise the further step of continuously transmitting TFO synchronization messages (e.g., TFO_FILL messages) in the transparent mode. These messages may serve to achieve synchronization of the transcoder units as well as the IPE with each other and may keep the IPE transparent for TFO messages and TFO frames.

In one mode of the invention, the method comprises the further step of starting a mismatch timer. The timer may for example be started after transmission of the TFO configuration frame. The mismatch timer may be started only after reception of a TFO configuration frame from the remote transcoder unit. The transmission of TFO synchronization messages may be stopped in response to expiry of the mismatch timer, in case no answer has been received in time. The mismatch timer allows to limit the time in which in-band signalling messages are exchanged, for example the synchronization messages. In-band signalling messages, e.g. messages for keeping IPE transparent, may slightly distort the speech quality of the ongoing communication.

The method may further comprise the step of stopping the transmission of TFO synchronization messages, for example in response to a detection of a matching codec from a remote TFO codec list received from the remote transcoder unit. In that case, steps for establishing the TFO state OPERATION may be performed. The transmission of TFO synchronization messages may also already be stopped in response to the reception of the remote TFO Codec List.

In one implementation, the method may further comprise the steps of receiving, in response to the transmitted transparent mode message, a TFO request message including a TFO codec list; and transmitting a TFO message including a local TFO codec list in response to the received TFO request. In case the remote transcoder unit is not enabled for the inventive technique, the transcoder unit may ignore the received transparent mode message and may proceed according to established standards, which may comprise sending a TFO request message. In that case, a fallback to the established procedure on both sides may be performed. For example, an ordinary TFO_REQL message including a distant TFO codec list may be received. In this case, a TFO_NORMAL message and then a TFO_ACK_L message including a local TFO codec list may be transmitted in response to the received TFO_REQ_L request message.

According to another aspect of the invention, a computer program product is proposed, the program product comprising program code portions for performing the steps of any one of the method aspects of the invention described herein when the computer program product is run on one or more computing devices. The computer program product may be stored on a computer readable recording medium, for example a CD-ROM or DVD.

According to a further aspect of the invention, a transcoder unit is proposed, which is adapted for controlling establishment of a tandem free operation for transfer of TFO frames including content frames between a first and a second transcoder unit without transcoding of the content frames. The transcoder unit comprises a reception component adapted for receiving in context with a TFO request information about a remotely used codec associated with a remote transcoder unit; a determination component adapted for determining, in response to the TFO request, if the remotely used codec meets a codec compatibility condition; a message transmission component adapted for transmitting, in case the remotely used codec does not meet the codec compatibility condition, a first transparent mode message indicating to in-path equipment a transparent mode for subsequent transparent TFO negotiation, and a frame transmission component adapted for transmitting, in the transparent mode, a TFO configuration frame indicating a local TFO codec list.

BRIEF DESCRIPTION OF THE DRAWINGS

In the following, the invention will further be described with reference to exemplary embodiments illustrated in figures, in which:

FIG. 4 is a flow chart illustrating steps of a second method embodiment for controlling establishment of a TFO;

DETAILED DESCRIPTION OF PREFERRED EMBODIMENTS

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with communications networks different from the UMTS network discussed below to illustrate the present invention. The invention may be practised with any network in which transcoding steps are performed. This may include for example wireless networks, as the transmission of data via an air interface may generally require compressing the data for efficient bandwidth usage. The data may not only be speech data, but may be any kind of data which can be compressed, e.g. video data.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that while the current invention is described as a method, it may also be embodied in a computer processor and a memory coupled to a processor, wherein the memory is encoded with one or more programs that perform the methods disclosed herein when executed by the processor.

The term 'interface' or 'interface component' as used herein may denote a 'functional interface', i.e. a sub-structure contained within a functional component or higher-level structure (e.g., a hardware and/or software component or functional entity) specifically designed for performing communications with further, external components or structures. A functional interface may typically, but not exclusively, be implemented as software.

Figure 1:
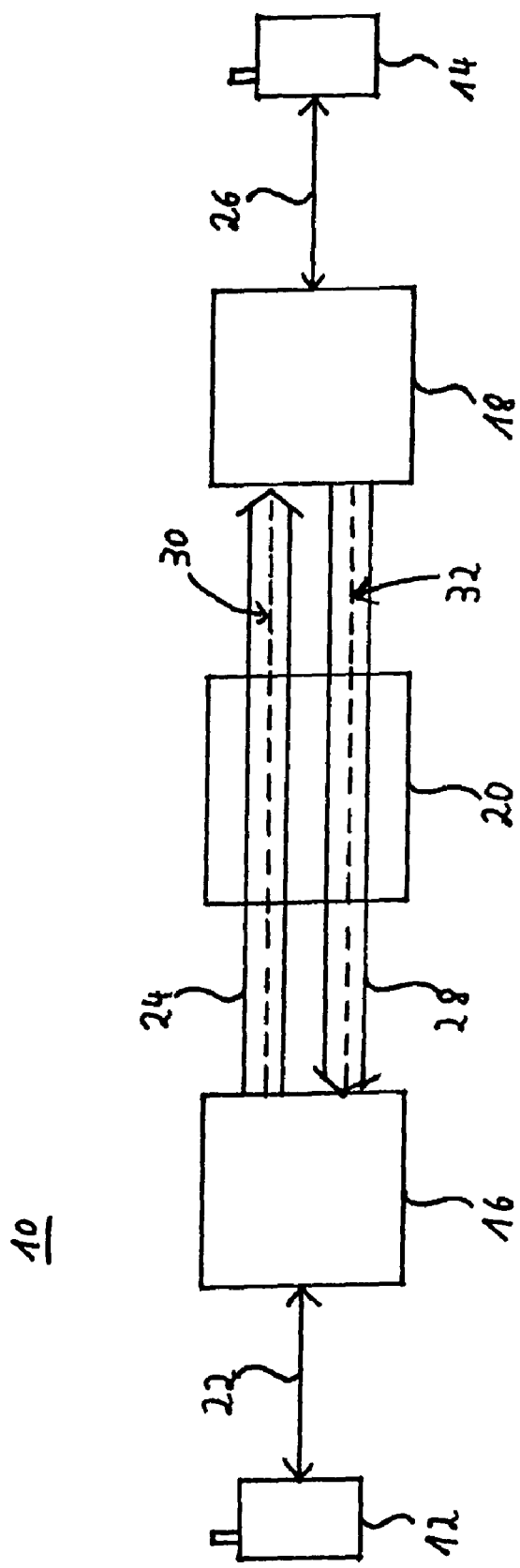
FIG. 1 is a schematic illustration of data communications in an ongoing MMC.

FIG. 1 schematically illustrates an embodiment 10 of a network configuration in which the invention may be practiced. Speech is conveyed between mobile devices 12 and 14 via transcoder units 16 and 18 and further IPE 20. The IPE 20 may be part of a fixed network or a radio access network and may comprise a switch.

In more detail, speech data may be compressed according to the GSM HR (Half Rate) coding scheme in the mobile device 12 and may then be transferred from the mobile device 12 via the air interface 22 to the transcoder unit 16. The speech data may alternatively be compressed according to the FR (Full Rate) or EHR (Enhanced Full Rate) scheme or any other suitable coding scheme (further examples are AMR, AMR-WB). A PCM link (or sublink) 24 has been established between transcoder units 16 and 18 during set-up of the call between the mobile devices 12 and 14. Without TFO, the transcoder unit 16 transcodes the speech samples received via the air interface 22 into PCM samples according to G.711 and transmits these samples via the PCM link 24 and towards the transcoder unit 18. Here, the received PCM samples are transcoded with a codec suitable for transmitting the speech data via the air interface 26 towards the mobile device 14. For example, the speech may be encoded with one of the codecs HR, FR or EFR. Conveyance of speech in the other direction, i.e. from the mobile device 14 via the transcoder unit 18, the PCM link 28 and the transcoder unit 16 towards the mobile device 12 is performed in a similar manner.

When TFO is in operation, speech frames are exchanged between the transcoder units 16 and 18 without transcoding. As an example, (compressed) HR speech frames may be transmitted via the PCM links 24 and 28 using only the least significant bit of every 8-bit PCM sample transmitted every 125 microseconds (corresponding to 8000 PCM samples per second). This is indicated by the dashed-lines 30 and 32 in the PCM links 24 and 28. Before speech frames can be exchanged without transcoding, the transcoder units 16 and 18 have to signal their respective LUCs, i.e. the codecs used over the air interfaces 22 and 26. In case the LUCs are not compatible with each other, a negotiation procedure will be required to compare the (other) available codecs of the TFO partners 16, 18 with each other. This will be described in the following.

Figure 2:
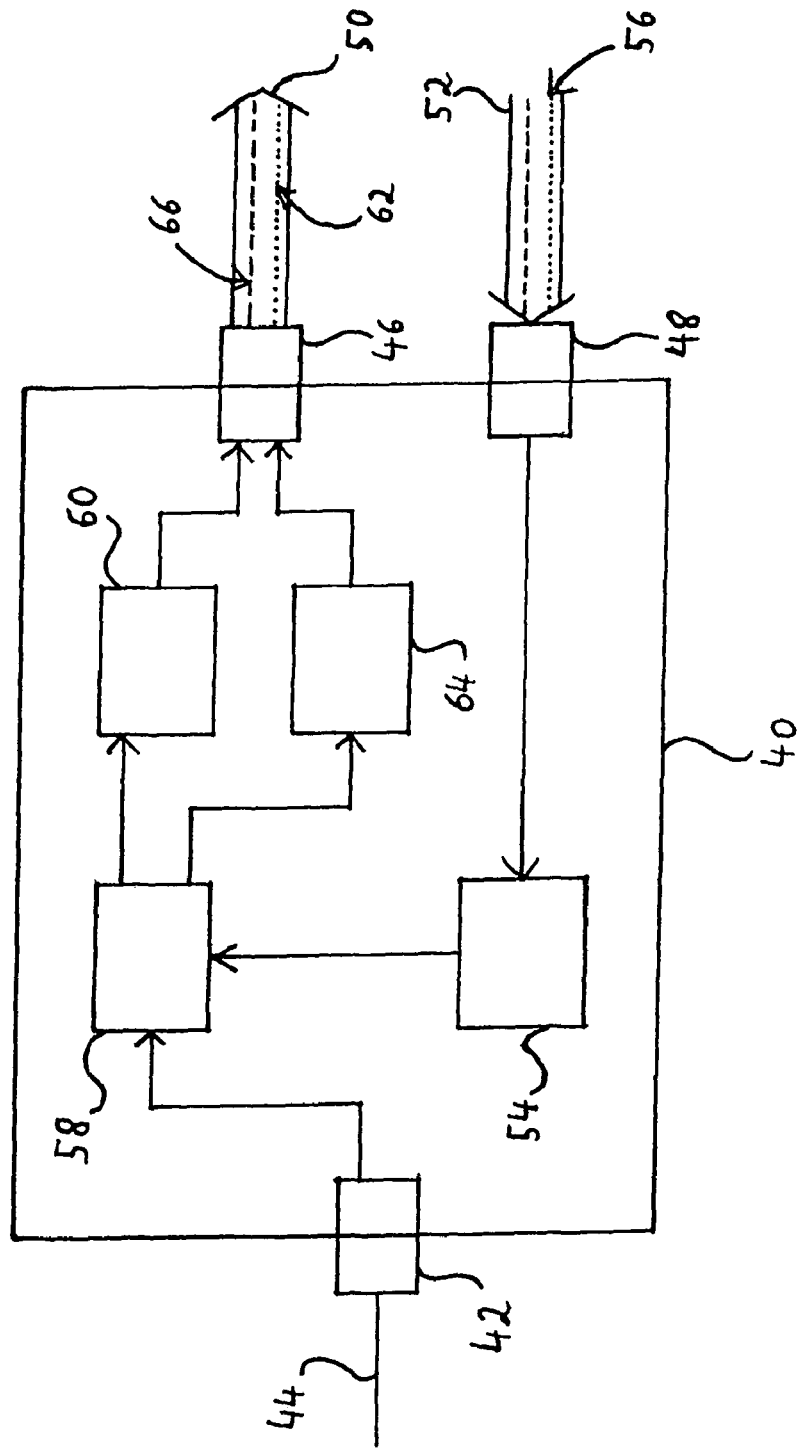
FIG. 2 is a functional block diagram schematically illustrating an embodiment of a transcoder unit.

FIG. 2 illustrates an embodiment of a transcoder unit 40, which is adapted for controlling establishment of a TFO for transfer of TFO frames including speech frames between the transcoder unit 40 and a further transcoder unit acting as a remote or distant TFO partner (not shown in FIG. 2). The transcoder unit 20 may be an implementation of the transcoder unit 16 or 18 of FIG. 1.

The transcoder unit 40 is exemplarily illustrated in FIG. 2 as being a stand-alone device. The transcoder unit 40 thus comprises an access interface 42 for receiving and transmitting speech data via the air interface 44 from/to a mobile device via a base station subsystem (not shown). The transcoder unit 40 further comprises PCM interfaces 46 and 48 for forwarding/receiving speech data to or from the remote TFO partner. The PCM interfaces 46 and 48 terminate PCM links 50 and 52.

The transcoder unit 40 further comprises a reception component 54 which is adapted for receiving in context with a TFO request a remotely used codec associated with a remote transcoder unit. In more detail, the reception component 54 of the embodiment shown in FIG. 2 is adapted for receiving a TFO request message including a local used codec from the remote transcoder unit.

The TFO request message is received via the PCM link 52 as an in-band signalling message. More precisely, the TFO request message may be a regular or embedded TFO message conveyed via the in-band signalling mechanism according to TS 28.062 within the stream of PCM samples received at the PCM interface 48. The in-band signalling data are illustrated by the dotted line 56. The reception component 54 extracts the LUC from the received TFO request and forwards the LUC to a determination component 58.

The determination component 58 is adapted for determining, in context with the TFO request, if the remotely used codec, i.e. the LUC of the remote transcoder unit, meets a codec compatibility condition. In more detail, the component 58 is triggered to by the LUC received from the TFO partner to internally request from the access interface 42 the LUC which is being used for conveying speech samples via the air interface 44. In alternative embodiments, the determination component 58 may extract the LUC used for the air interface 44 from a storage component of the transcoder unit 40 or may request this information from a TFO control server of the transcoder unit 40 (not shown).

The determination component 58 then performs a comparison between the two LUCs to determine if the codecs are identical or at least compatible to each other. In case the codecs are at least compatible to each other, the component 58 may forward this result to further components of the transcoder unit 40 (not shown in FIG. 2) to trigger further procedures for entering the TFO status OPERATION. In case the codecs are not compatible to each other, the determination component 58 triggers a message transmission component 60.

The message transmission component 60 is adapted for transmitting, in case the remotely used codec does not meet the codec compatibility condition, a transparent mode message. The transparent mode message indicates a transparent mode to in-path equipment for subsequent transparent TFO negotiation to the remote transcoder unit. In more detail, the message transmission component 60 constructs a transparent mode message. For example, a TFO_TRANS (2) or a TFO_TRANS (4) message according to TS 28.062 may be constructed (referred to as TFO_TRANS (16 k) and TFO_TRANS (32 k) messages therein). In another example, a TFO_TRANS (8) message may be constructed which is intended to indicate that all 8 bits of PCM frames shall be handled transparently. The message is provided to the PCM interface 46. The PCM interface 46 forwards the transparent mode message as a regular in-band signalling message within the stream of PCM samples 50. The in-band signalling data are indicated by the dotted line 62.

The determination component 58 additionally triggers a frame transmission component 64, which is adapted for transmitting, in the transparent mode, a TFO configuration frame indicating a local TFO codec list. For example, the determination component 58 may request from the access interface 42 (or a storage component or a TFO control server) the list of codecs available for the air interface 44 and may forward this list as a trigger to the frame transmission component 64. The frame transmission component 64 inserts the received local TFO codec list into a configuration frame, for example a Generic Configuration Frame according to the TS 28.062, Annex H. In case a TFO_TRANS (8) has been sent beforehand, all bits of the TFO configuration frame may completely be used for indicating the local TFO codec list. For example, a similar structure as for the transfer of codec lists in BICC or SIP may be used, which may however be slightly adapted to the requirements of the TFO framework (e.g. a GCF must be 20 ms long and must follow a certain sync scheme). Thus, a TFO configuration frame such as a GCF according to the TS 28.062, but adapted to use a bandwidth of not only 8 kbit/s (TFO_TRANS(1)) or 16 kBit/s (TFO_TRANS(2)) but of 64 kbit/s may be used. The frame transmission component 64 provides the so constructed configuration frame to the PCM interface 46, which forwards the TFO configuration frame within the PCM link 50. The forwarding mechanism for TFO frames and TFO configuration frames is indicated by the dashed line 66.

In an alternative embodiment the transcoder unit may be part of a hardware device, for example a media gateway. In that case the access interface and the PCM interfaces may be seen primarily as being part of the larger hardware device. However, the functionality of the transcoder unit will essentially be the same as described here with reference to the stand-alone device 40 in FIG. 2.

Figure 3:
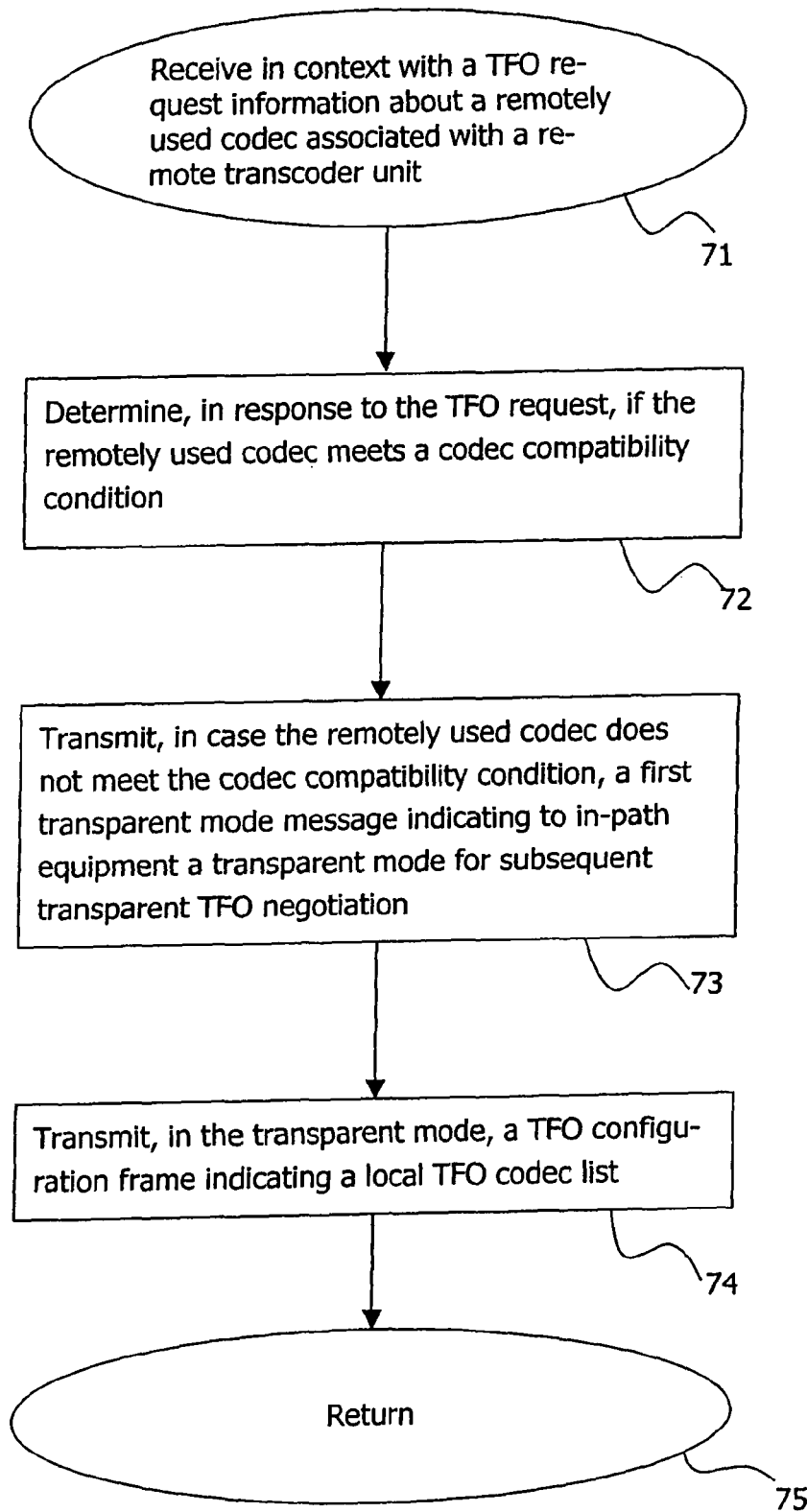
FIG. 3 is a flow chart illustrating steps of a first method embodiment for controlling establishment of a TFO.

FIG. 3 is a flow diagram illustrating an embodiment 70 of a method of controlling establishment of a tandem free operation for transfer of TFO frames including speech frames between a first and a second transcoder unit without transcoding of the speech frames.

In step 71, the method is triggered by receiving in context with a TFO request (or TFO acknowledge) information about a remotely used codec associated with a remote transcoder unit.

The remotely used codec may for example be the LUC of the remote transcoder unit according to the TS 28.062, or may be any other codec which is used, for example, for the air interface near to the remote transcoder unit.

In response to receiving the TFO request in step 72 it is determined if the remotely used codec meets a codec compatibility condition with a local used codec. In case the remotely used codec does not meet the codec compatibility condition, a first transparent mode message indicating to in-path equipment a transparent mode for subsequent transparent TFO negotiation is transmitted (step 73). In other embodiments, several transparent mode messages may be transmitted. Subsequent to transmitting the transparent mode message, a TFO configuration frame indicating a local TFO codec list it transmitted in the transparent mode (step 74). The method returns in step 75, for example, to further procedures related to the establishment of a TFO.

FIG. 4 is a flow diagram illustrating an embodiment 100 of a method of controlling establishment of a tandem free operation for transfer of TFO frames including speech frames between a first and a second transcoder unit without transcoding of the speech frames.

The steps 102 and 104 correspond to steps 71 and 72 of FIG. 3. In step 106, in case the remotely used codec does not meet the codec compatibility condition, zero or more transparent mode messages are transmitted, wherein the messages indicate to in-path equipment a transparent mode for subsequent transparent TFO negotiation. In step 108, in the transparent mode, a TFO configuration frame indicating a local TFO codec list is transmitted. In step 110, in the transparent mode, zero or more normal mode messages indicating to in-path equipment a return to a normal operation are transmitted.

In some cases, no transparent mode messages may be required prior to sending the configuration frame indicating the local TFO codec list. For example, no IPEs may be in the TFO path according to a network architecture. The configuration frame may be sent immediately in response to the detection of the mismatch of the local and the remotely used codecs. Further, in such cases also no normal mode messages and no TFO synchronisation messages are required, as there are no IPEs which have to be switched back to a normal mode or kept transparent. Normal mode messages, such as TFO_NORMAL messages according to the TS 28.062, are provided to command possible IPEs to normal operation, i.e. (for example) to terminate a transparent mode operation.

In the embodiment 100, no transparent mode message may be sent, for example in a case in which the network architecture ensures that no IPEs are in the TFO path. In that case also the TFO normal mode messages may be omitted and TFO synchronisation messages may not be required. Thus a TFO configuration frame may be sent immediately. This may accelerate and simplify the exchange of configuration data.

Figure 5:
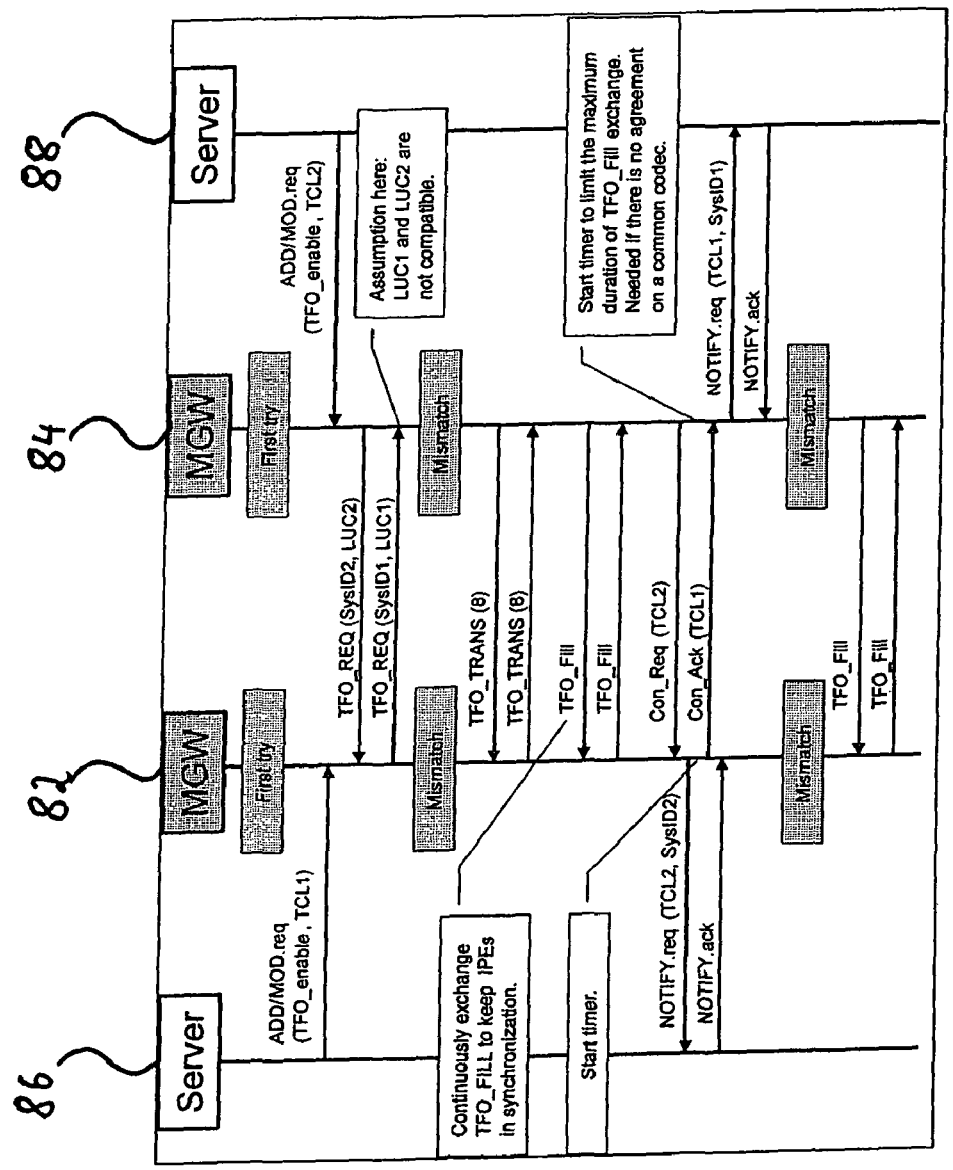
FIG. 5 is a sequence diagram illustrating steps of a third method embodiment for controlling establishment of a TFO.

FIG. 5 is a sequence diagram illustrating an embodiment of a flow of messages and frames for controlling establishment of a TFO. It is assumed that speech is conveyed via one or more UMTS networks between media gateways (MGWs) 82 and 84. The MGWs are controlled by server nodes 86 and 88. The MGWs incorporate transcoder units, which may be implementations of the transcoder units 16, 18 of FIG. 1 or of the transcoder unit 40 of FIG. 2. Each of the server nodes 86, 88 may be an MSC (Mobile Switching Center) or a TSC (Transit Switching Center).

In a first try to establish TFO, the server nodes 86 and 88 command their corresponding MGWs to exchange information indicating their respective locally used codecs, i.e. their LUCs. To this end, the media gateways 82, 84 exchange TFO_REQ in-band signalling messages according to TS 28.062, each message including the LUC as well as a system identification identifying the system within which the message is generated. The system IDs may here indicate an UMTS system on both sides.

In the example illustrated in FIG. 5, it is assumed that the LUCs are not compatible. Therefore, TFO is set to status MISMATCH by the TFO partners. The TFO mismatch may typically be detected within 200 milliseconds after the exchange of the TFO request messages including the LUC-related information has been started. The TFO handler (i.e. the determination component 58 according to FIG. 2) in each of the MGW transcoder units immediately triggers transmission of transparent mode messages TFO_TRANS (8). These messages command the IPE (not shown) in the PCM paths between the MGWs 82 and 84 into the fully transparent mode, i.e., they command the IPE to let all 8 bits of the PCM frames (PCM samples) pass transparently. The exchange of the transparent mode messages may cause a slight click due to the removal of the IPEs from the PCM path and the corresponding jump in delay. It should be noted, however, that the TFO_TRANS (8) message causes less distortion than for example TFO_TRANS (2) (the two least significant bits have to be passed transparently; this message is referred to as TFO_TRANS (16 k) in the TS 28.062), because all 8 bits of the PCM octets remain consistent, while in case of TFO_TRANS(2) only 6 PCM bits would remain consistent within the IPE and the lower two bits would be copied transparently from input to output of the IPE.

Subsequent to the exchange of the transparent mode messages the TFO partners 82 and 84 start to continuously send synchronization messages. In the example of FIG. 5, the synchronization messages are TFO_FILL messages according to TS 28.062. These messages keep the TFO partners as well as the IPE in synchronization. As speech is further conveyed via the normal transcoding mechanism and via PCM between the MGWs 82 and 84, the exchange of TFO in-band signalling messages may cause a tiny distortion in speech quality, which will be nearly or completely inaudible.

The MGWs 82 and 84 then exchange TFO configuration frames, namely CON_REQ/CON_ACK frames which are based on the generic configuration frames according to the TS 28.062, Annex H. Each of the configuration frames carries a local TFO codec list (TCL), which has been provided by the control servers 86 and 88. The configuration frames can be exchanged as any IPE is fully transparent for TFO frames and thus also for TFO configuration frames (TFO configuration frames are TFO frames carrying configuration information instead of speech data). Sending of one of the configuration frames takes approximately 20 milliseconds, whereas a TFO request message including a complete TCL may take about 300 milliseconds. Each of the MGWs 82 and 84 extracts and removes these TFO configurations frames from the PCM stream in order to avoid audible artefacts and notifies its control server of the received TFO codec list. In further procedures both sides may now decide, based on the TCLs, on a common compatible codec pair for establishing TFO in operational mode. In case no compatible codec pair is available, TFO remains in mismatch state and the media gateways 82 and 84 continue to send synchronization messages, as illustrated in FIG. 5, or they send TFO_Normal messages and let the IPEs come back into normal operation.

In context with exchanging the configuration frames, a timer is started in each of the transcoder units of MGW 82 and 84. The timer serves to limit the maximum duration of the exchange of synchronization messages and thus limits the tiny distortion of speech quality during the TFO establishment procedure. The timer may expire for example after 100 milliseconds or several hundred milliseconds. The timer may be started already after sending of the configuration frame or may be started only after reception of the configuration frame from the other TFO partner. The timer will be stopped in case a matching codec can be found and TFO goes into state OPERATION.

In an alternative embodiment, only one of the TFO partners is enabled for the procedure outlined exemplarily in FIG. 5. In that case, this transcoder unit would send in response to the detection of the TFO mismatch state the transparent mode message, but may not receive such a message from the other TFO partner. Instead, the opposite transcoder unit may send a TFO request message (not a configuration frame), for example a TFO_REQL message, including the TFO codec list. For backward compatibility, this message may then be responded to by also sending a TFO request message including a TCL, for example a TFO_ACK_L, which may be sent after a TFO_Normal message has been sent.

Figure 6:
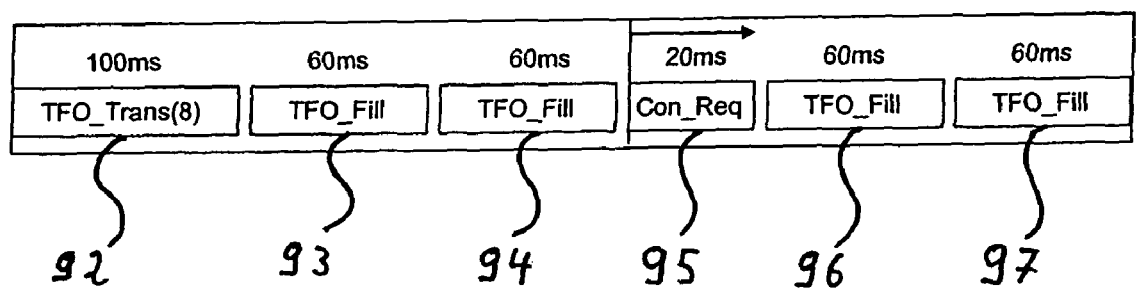
FIG. 6 is a schematic illustration of a time sequence of TFO messages and configuration frames according to a particular embodiment of the invention.

FIG. 6 schematically illustrates an exemplary time sequence 90 of messages and frames transmitted by a transcoder unit during TFO establishment. The transcoder unit may be for example one of the transcoder units 16 and 18 of FIG. 1, the transcoder unit 40 of FIG. 2, or one of the transcoder units in the MGWs 82 and 84 of FIG. 5. After detection of TFO state MISMATCH the transcoder unit immediately sends a transparent mode message TFO_TRANS (8) 92. The transmission of this message takes 100 milliseconds.

After the transparent mode message 92 has been sent, the transcoder unit continuously sends synchronization messages TFO_FILL 93, 94. The transmission may continue for example as long as the transcoder unit has not received a responding transparent mode message and/or as long as the construction of the subsequent configuration frame has not been finished and as long as the timeout timer has not expired or no traditional TFO_REQ_L with traditional TCL has been received.

Then, the transcoder unit sends a configuration frame Con_Req 95 which includes the TCL. Passing this message takes 20 milliseconds, which causes only a very small audible distortion of the speech quality. Subsequently, the transcoder unit continues sending synchronization messages 96, 97, to keep the TFO partner and IPE in synchronization as long as there are no other TFO frames or messages to be transmitted. Sending of TFO_FILL continues until a compatible codec has been found and TFO goes into state OPERATION, or until a timer expires and therefore the sending of the synchronization messages is stopped or until the TFO Partners decide that the protocol is sufficiently advanced and no further need for the exchange of configuration data is given.

In the embodiments exemplarily described herein, messages to reset the IPE into a normal operational state (e.g. by a TFO_NORMAL message) may not be required.

Some of the embodiments described herein comprise the step of transmitting a TFO configuration frame indicating a TFO codec list. The configuration frame is passed in the same way as the TFO frames carrying speech data between transcoder units. However, the configuration frame does not comprise speech data but signalling data, in particular the TCL of the sending transcoder unit. As the configuration frame is sent using the full bandwidth available for conveyance of the TFO frames (e.g. 160 bit/20 ms or 320 bit/20 ms and up to 1280 bit/20 ms), it may be sent much faster than any in-band signalling message. As exemplarily described above, a configuration frame (a GCF) according to the TS 28.062 may be transmitted within 20 milliseconds, whereas a TFO request message including a TCL may take 16 to 32 times longer. The transmission of such a configuration frame thus leads only to a short distortion of the speech signal when embedded into the (1 or 2) least significant bits of, e.g., a PCM signal. The human auditory system mostly ignores such short, low level distortions. Therefore, configuration frames such as the GCFs according to the TS 28.62 for transporting TFO Codec Lists may be used to achieve a much faster TCL exchange compared to an in-band signalling mechanism, which is designed to impact the speech quality as least as possible and therefore necessarily provides a very small bandwidth for signalling messages only.

In order to send configuration frames, possibly some precautions must be taken to command potential in-path equipment (IPEs) to let the configuration frames pass without modification. By transmitting a transparent mode message, the receiving IPE is forced to let subsequent TFO frames (in particular a TFO configuration frame) pass transparently. In practice, zero, one or more transparent mode messages (e.g., TFO_TRANS messages) may be sent, which are then followed immediately by the configuration frame and which then may be followed by zero or more TFO NORMAL messages. The latter may be necessary to reset the IPEs into their normal operational state, if one or more TFO_TRANS messages have been sent before.

These sequences may be followed by each TFO partner. The technique proposed herein thus allows to quickly establish TFO—in case the local used codecs of the TFO partners do not match—compared to an exchange of the complete TCLs with TFO messages according to an in-band signalling mechanism. The exchange of full and flexibly structured codec lists accelerates the establishment procedure and improves the chances that TFO may be successfully established at all. The technique provides a mechanism for fast transfer of the complete TFO codec lists, such that as fast as possible a common, compatible codec pair can be found and a transcoding free path can be established. Further, codec lists may be exchanged indicating preferred and less preferred codecs by sorting the codec types in the list accordingly. Further, detailed configuration information per codec may also be provided. Still further, for one codec type more than one alternative configurations may be listed. The technique proposed herein also allows for proprietary codec extensions. The techniques supports fast TFO establishment with an at most tiny degradation in speech quality during the establishment phase.

While the current invention has been described in relation to its preferred embodiments, it is to be understood, that this disclosure is only illustrative. Accordingly, it is attended that the invention be limited only by the scope of claims appended hereto.

The invention claimed is:

1. A method of controlling establishment of a tandem free operation (TFO) for transfer of TFO frames including content frames between a first and a second transcoder unit without transcoding of the content frames, the method comprising the following steps:
    receiving, in context with a TFO request, information about a remotely used coded associated with a remote transcoder unit;
    determining, in response to the TFO request, if the remotely used coded meets a codec compatibly condition;
    transmitting, in case the remotely used coded does not meet the coded compatibly condition, a first transparent mode message indicating to in-path equipment a transparent mode for subsequent transparent TFO negotiation;
    transmitting, in the transparent mode, a TFO configuration frame indicating a local TFO codec list; and continuously transmitting TFO synchronization messages in the transparent mode.

2. The method according to claim 1, wherein two or more first transparent mode messages are transmitted prior to transmitting the TFO configuration frame.

3. The method according to can 1, comprising the further steps of
receiving a second transparent mode message from the remote transcoder unit; and
transmitting the TFO configuration frame in response to the received transparent mode message.

4. The method according to claim 1, wherein the transparent mode message or messages indicate that all frame bits are to be passed transparently.

5. The method according to claim 1, wherein the TFO configuration frame uses all frame bits for indicating the local TFO codec list.

6. The method according to claim 1, wherein the local TFO codec list transmitted to the remote transcoder unit indicates a preference of codecs and/or configuration information for at least one codec.

7. The method according to claim 1, comprising the further step of starting a mismatch timer.

8. The method according to claim 7, comprising the further step of stopping the transmission of TFO synchronization messages in response to expiry of the mismatch timer.

9. The method according to claim 7, wherein the mismatch timer is started only after reception of a TFO configuration frame from the remote transcoder unit.

10. The method according to claim 1, comprising the further step of stopping the transmission of TFO synchronization messages in response to a detection of a matching codec from a remote TFO codec list received from the remote transcoder unit.

11. The method according to claim 1, comprising the further steps of:
receiving, in response to the transmitted transparent mode message, a TFO request message including a remote TFO codec list; and
transmitting a further TFO request message including a local TFO codec list in response to the received TFO request message.

12. A transcoder unit adapted for controlling establishment of a tandem free operation (TFO) for transfer of TFO frames including content frames between a first and a second transcoder unit without transcoding of the content frames, the transcoder unit comprising:
a reception component adapted for receiving in context with a TFO request information about a remotely used codec associated with a remote transcoder unit;
a determination component adapted for determining, in response to the TFO request, if the remotely used codec meets a codec compatibility condition;
a message transmission component adapted for transmitting, in case the remotely used coded does not meet the codec compatibility condition, a first transparent mode message indicating to in-path equipment a transparent mode for subsequent transparent TFO negotiation; and
a frame transmission component adapted for transmitting, in the transparent mode, a TFO configuration frame indicating a local TFO codec list; and
the message transmission component continuously transmitting TFO synchronization messages in the transparent mode.

* * * * *

UNITED STATES PATENT AND TRADEMARK OFFICE
CERTIFICATE OF CORRECTION

| | |
|---|---|
| PATENT NO. | : 8,369,267 B2 |
| APPLICATION NO. | : 12/523675 |
| DATED | : February 5, 2013 |
| INVENTOR(S) | : Hellwig et al. |

It is certified that error appears in the above-identified patent and that said Letters Patent is hereby corrected as shown below:

In the Specifications

In Column 2, Line 25, delete "TFO_REQL" and insert -- TFO_REQ_L --, therefor.

In Column 4, Line 42, delete "locl" and insert -- local --, therefor.

In Column 5, Line 16, delete "TFO_REQL" and insert -- TFO_REQ_L --, therefor.

In Column 6, Line 52, delete "EHR" and insert -- EFR --, therefor.

In Column 7, Line 53, delete "to by" and insert -- by --, therefor.

In Column 11, Line 13, delete "TFO_REQL" and insert -- TFO_REQ_L --, therefor.

In Column 11, Line 64, delete "a configuration" and insert -- a generic configuration --, therefor.

In Column 12, Line 13, delete "(IPEs)" and insert -- (IPE) --, therefor.

In the Claims

In Column 12, Line 57, in Claim 1, delete "coded" and insert -- codec --, therefor.

In Column 12, Line 60, in Claim 1, delete "coded" and insert -- codec --, therefor.

In Column 12, Line 60, in Claim 1, delete "compatibly" and insert -- compatibility --, therefor.

In Column 12, Line 62, in Claim 1, delete "coded" and insert -- codec --, therefor.

Signed and Sealed this
Fourteenth Day of May, 2013

Teresa Stanek Rea
*Acting Director of the United States Patent and Trademark Office*

CERTIFICATE OF CORRECTION (continued)
U.S. Pat. No. 8,369,267 B2

In Column 12, Line 63, in Claim 1, delete "coded compatibly" and insert -- codec compatibility --, therefor.

In Column 13, Line 6, in Claim 3, delete "can" and insert -- claim --, therefor.

In Column 13, Line 7, in Claim 3, delete "of" and insert -- of: --, therefor.

In Column 14, Line 21, in Claim 12, delete "coded" and insert -- codec --, therefor.